L. R. BRANTLEY.
PLANTER.
APPLICATION FILED DEC. 22, 1921.
1,428,527.
Patented Sept. 12, 1922.
2 SHEETS—SHEET 2.
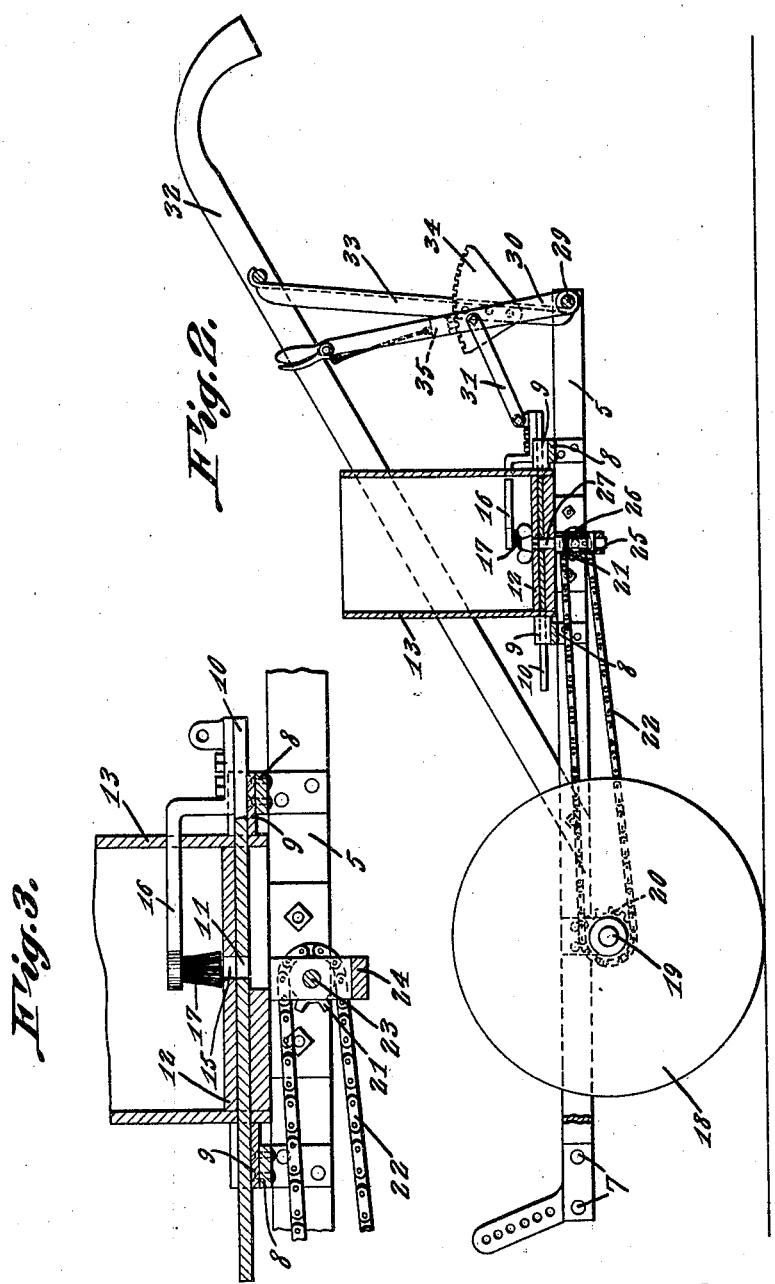
Inventor
L. R. Brantley,
By C. A. Snow & Co.
Attorneys.

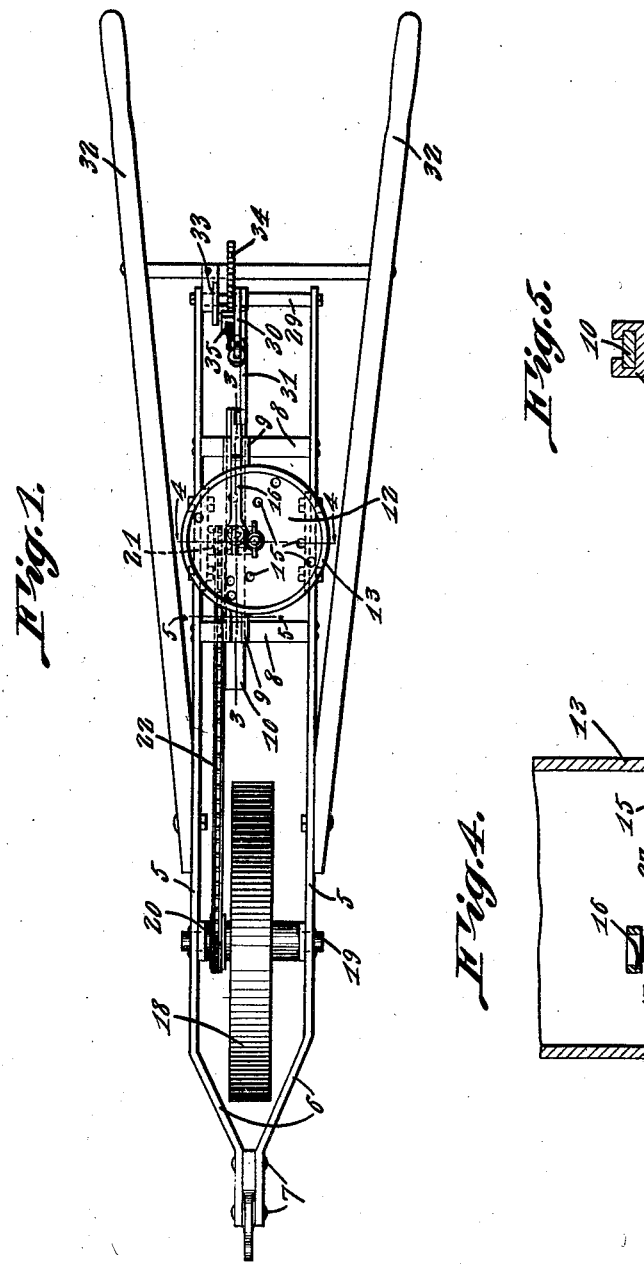

Patented Sept. 12, 1922.

1,428,527

UNITED STATES PATENT OFFICE.

LEWIS R. BRANTLEY, OF MARIETTA, GEORGIA.

PLANTER.

Application filed December 22, 1921. Serial No. 524,212.

*To all whom it may concern:*

Be it known that I, LEWIS R. BRANTLEY, a citizen of the United States, residing at Marietta, in the county of Cobb and State of Georgia, have invented a new and useful Planter, of which the following is a specification.

This invention has reference to seeders and planters, the primary object of the invention being to provide a seeder having novel means for timing the seed dropping operation, whereby the seed may be dropped at various intervals, at the will of the operator.

Another object of the invention is to provide means for preventing more than the required number of seed necessary in planting, from passing through the planter.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:—

Figure 1 is a plan view of a planter constructed in accordance with the present invention.

Figure 2 is a side elevational view disclosing the seed hopper in section.

Figure 3 is a fragmental sectional view of the seed hopper and disclosing the receiving opening of the movable plate and registering with the outlet opening of the hopper, taken on line 3—3 of Figure 1.

Figure 4 is a sectional view taken on line 4—4 of Figure 1.

Figure 5 is a sectional view taken on line 5—5 of Figure 1.

Referring to the drawings in detail, the planter embodies side bars 5 which have their forward portions extending inwardly as at 6, where the same are connected as by means of the bolts 7.

Connecting the side bars 5, are the transversely extending bars 8 which provide a support for the guide bar 9 which is grooved to accommodate the sliding plate 10 which is formed with an opening 11 adapted to register with an opening in the movable bottom 12 of the seed hopper.

The hopper which is indicated at 13, may be of any desired construction, and provided with a rotatable bottom 12 which is formed with a plurality of openings 15, the openings being arranged in staggered relation with each other. Carried by the sliding plate 10 is an arm 16 which extends through an opening in the wall of the hopper 13 and is provided with a brush 17, which normally engages the movable bottom member 12 so that the brush will move the surplus seed away from the delivering opening when the delivering opening has moved to a position in registry with the opening 11 of the plate 10, thereby preventing more than the necessary number of seeds passing from the hopper.

Supporting wheel 18 is mounted on the axle 19, which axle supports the sprocket wheel 20 that imparts movement to the sprocket wheel 21 through the medium of the chain 22. This sprocket wheel 21 is mounted on the shaft 23 that is carried by the frame 24, the beveled pinion 25 being carried at one end of the shaft 23 for imparting rotary movement to the pinion 26 which is shown as in mesh therewith.

Supporting the pinion 26, is a vertical shaft 27 that has its lower end positioned within a suitable opening in the bracket 24 as indicated at 28, the upper end of the vertical shaft 27 having connection with the rotatable bottom member 12, so that movement of the shaft will cause a relative movement of the bottom member 12, to deposit a seed.

The side rails 5 provide a support for the rod 29 on which the lever 30 is mounted, which lever has connection with the sliding plate 10, as through the link 31 so that the lever 30 may be moved to adjust the plate 10 to bring the opening 11 thereof to a point to register with a predetermined opening of the movable bottom member 12. The usual guiding arms 32 provide a part of the planter, which arms also support the bar 33 which in turn supports the segmental rack 34 to cooperate with locking means 35 carried on the lever 30.

From the foregoing it will be seen that by moving the plate 10 to bring the opening 11 thereof to a point adjacent to the axis of the movable bottom 12, seed will be deposited through the opening more rapidly than if the plate is moved to a positon to bring the opening 11 into registry with an opening disposed in the movable bottom and located adjacent to the periphery thereof.

Having thus described the invention, what is claimed as new is:—

1. A planter comprising a frame, a hopper carried by the frame and having a rotatable bottom member formed with openings, a slidable plate adapted to be adjusted with respect to the bottom member, said plate having an opening, said plate adapted to be moved to bring the opening thereof to a position under a predetermined opening of the rotatable bottom member, means for rotating the bottom member, means for securing the plate in its positions of adjustment, and means movable with the plate for guarding the opening in the rotatable bottom member.

2. A planter comprising a frame, a hopper supported by the frame, said hopper having a rotatable bottom member, said bottom member having openings, a sliding plate under the bottom member and having an opening, means for adjusting the plate to bring the opening to various positions with respect to the rotatable bottom member, a bracket carried by the plate, said bracket having one end extending into the hopper, a brush depending from the free end of the bracket and contacting with the upper surface of the rotatable bottom member to guard the openings, and means for rotating the bottom member.

In testimony that I claim the foregoing as my own, I have hereto affixed my signature in the presence of two witnesses.

LEWIS R. BRANTLEY.

Witnesses:
 FRED T. BURTON,
 ALLEN PYBASS.